July 12, 1966 J. H. P. BROWN 3,260,523
ROCK AND ROLL CYLINDER
Filed March 13, 1964
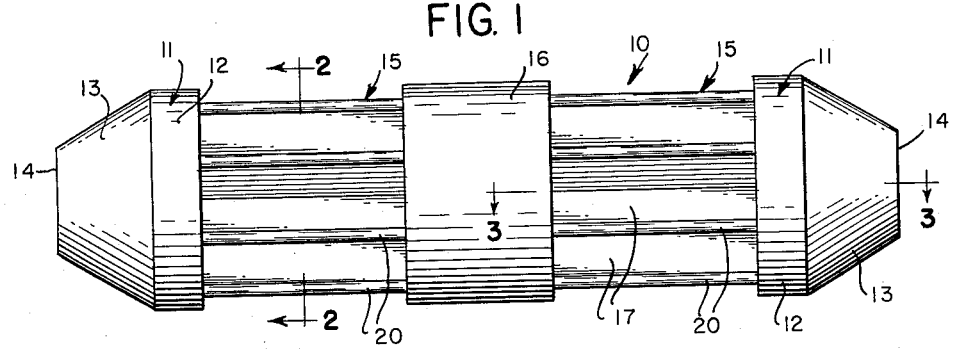
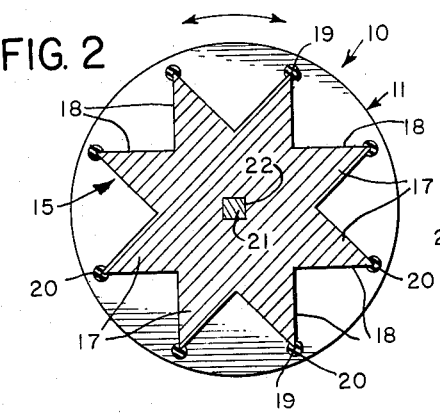
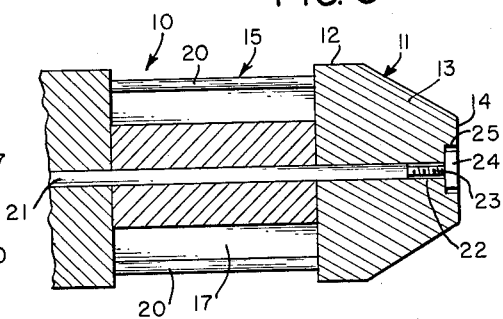
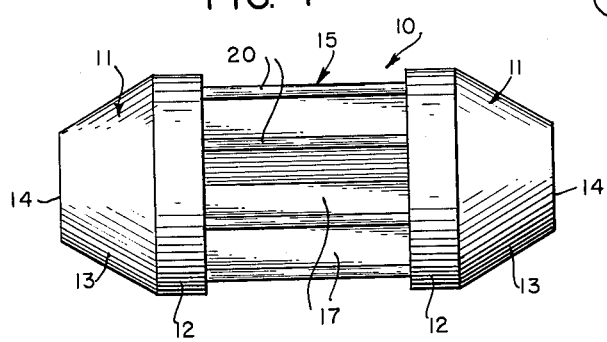
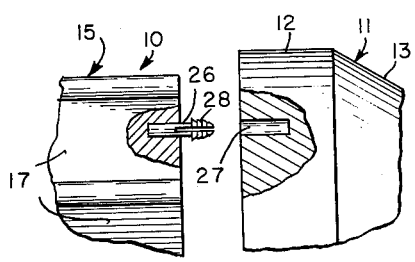
INVENTOR
JAMES H. P. BROWN
BY
ATTORNEYS the slippage of the feet as well as to provide protection for the ankles and feet of the operator.

United States Patent Office 3,260,523
Patented July 12, 1966

3,260,523
ROCK AND ROLL CYLINDER
James Hardin Peterson Brown, P.O. Box 216,
Lakeland, Fla.
Filed Mar. 13, 1964, Ser. No. 351,869
6 Claims. (Cl. 272—1)

This invention relates to the development of balance and muscular coordination, and particularly to a device which can be used on either land or water by one or more persons.

Heretofore many devices have been provided for developing and improving muscular coordination and balance including birling logs, teeter-totters, large balls and cylinders. However, these prior devices usually have been relatively smooth and have lacked facilities for placing the feet of the operator on a relatively flat surface and have required an exceptional amount of skill to operate.

It is an object of the invention to provide a generally cylindrical body having one or more footwells, each of which has a plurality of generally parallel or coextensive surfaces disposed on opposite sides of the cylinder and adapted to receive the feet of an operator so that the operator can balance himself.

Another object of the invention is to provide a generally cylindrical body with one or more footwells recessed within the outer periphery of the body so that when a person places his feet within the footwells he can shift his weight to one foot or the other and cause the cylindrical body to roll in either direction.

Other objects and advantages of the invention will be apparent from the following description taken in conjunction with the accompanying drawing in which:

FIG. 1 is a side elevation illustrating one embodiment of the invention;

FIG. 2, an enlarged section taken on the line 2—2 of FIG. 1;

FIG. 3, a section taken on the line 3—3 of FIG. 1;

FIG. 4, a side elevation of the present invention illustrating another embodiment; and, FIG. 5, an enlarged fragmentary detail of a modified form of the invention.

With continued reference to the drawing, a body 10 is provided of generally cylindrical configuration and such body includes an end cap 11 at each end. Each of the end caps 11 has a cylindrical portion 12 of any predetermined diameter and if desired such end caps may have a tapered frusto-conical portion 13 terminating in a flattened extremity 14. As illustrated in FIG. 1 a pair of footwells 15 are separated by an intermediate spacer 16 and are disposed between the end caps 11. The intermediate spacer 16 is of substantially the same diameter as the cylindrical portion 12 of the end caps 11 so that the body 10 will be supported by the cylindrical portions 12 and the intermediate spacer 16.

Each of the footwells 15 includes a plurality of angularly disposed portions 17 arranged radially of the central longitudinal axis of the body 10. Each of the angularly disposed portions 17 has a pair of tapered generally flat surfaces 18 defining foot supports with the foot support on one side being generally co-extensive with the foot support on the opposite side so that a person can place his feet on the flat surfaces 18 on opposite sides of the body and can balance himself.

As illustrated each of the footwells is provided with eight angularly disposed portions 17. However, it is noted that any number of angularly disposed portions could be employed merely by changing the angularity of the flat surfaces 18. Preferably the flat surfaces converge to a point 19 and if desired such point can be covered by an enlargement or ridge 20 constructed of rubber or other flexible material and adapted to prevent slippage of the feet as well as to provide protection for the ankles and feet of the operator.

Each of the elements of the body 10 can be made independently and connected together by a central rod or shaft 21 having means to prevent relative rotation between the individual elements. As illustrated the shaft 21 is generally square in cross-section and is received within square openings 22 in each of the elements; however, any conventional means for preventing relative rotation would suffice. Each end of the shaft 21 is provided with a threaded portion 23 which threadedly receives a cap nut 24 located within a recess 25 extending inwardly from the flat extremity 14 of each end cap. It is contemplated that the entire body 10 could be molded or formed as an integral unit in which case the shaft 21 and cap nuts 24 would be eliminated.

With reference to FIG. 4 a body 10 is provided having a pair of end caps 11 separated by a single footwell 15 for use by an individual operator.

With reference to FIG. 5 a modified form of the invention is illustrated in which one of the elements is provided with a male prong 26 and an adjacent element is provided with a female recess 27 which cooperatively receives the prong 26. If desired the prong 26 may have a plurality of serrations or teeth 28 adapted to engage the material surrounding the recess 27 and thereby lock the adjoining elements in assembled relation.

In the operation of the device the body 10 is placed on a generally flat surface and thereafter an operator straddles the body with his feet on the ground on both sides of the body 10. By leaping into the air the person can place his feet on the flat surfaces 18 on opposite sides of the body and can balance himself in such position while preventing any rolling movement of the body. After the operator has gained his balance he can shift his weight to one side or the other which would cause the body to roll in the direction in which he shifted his weight, and thereafter the operator can move his feet to other foot supports and cause the body to continue to roll in the same direction. Likewise the operator can shift his weight in the other direction and cause the body to stop rolling or to roll in the opposite direction. After a person has become accomplished at rolling the body in one or both directions, he can place one foot on the cylindrical portion 12 of the end cap and the other foot on the tapered portion 13 and by shifting his weight can cause the opposite end of the body to be raised so that the tapered portion 13 is in engagement with the ground and thereafter by shifting his weight while maintaining his balance the operator can cause the body to turn in a circle.

When the body is provided with two or more footwells 15, it will accommodate a plurality of operators who can work together to roll the body in either direction or who can engage in a contest with one operator trying to unbalance the other operator while maintaining his own balance.

Although the device has been described for use on land, it is apparent that it could be constructed of buoyant material to support the weight of the operator in a body of water. When used on water the angularly disposed portions 17 will function as paddle wheels to move the body sidewise when the body is rotated by the operator.

It will be obvious to one skilled in the art that various changes may be made in the invention without departing from the spirit and scope thereof and therefore the invention is not limited by that which is illustrated in the drawing and described in the specification, but only as indicated in the accompanying claims.

I claim:
1. An elongated cylinder for use on land or water to develop balance and coordination comprising a body having relatively smooth generally cylindrical end por- tions, at least one footwell located within said body and between said cylindrical portions, said footwell including a plurality of angularly disposed portions defining foot supports on opposite sides of said body, the foot support on one side being substantially parallel with a foot support on the other side, and said angularly disposed portions being recessed within said body, whereby a person can place his feet on the foot supports on opposite sides of said body and balance himself thereon and by shifting his weight can cause the body to roll in either direction while moving his feet to other foot supports.

2. The structure of claim 1 in which each of said angularly disposed portions terminates in a ridge to prevent slippage of the feet.

3. The structure of claim 1 including a plurality of footwells spaced along the longitudinal axis of said body and separated by intermediate cylindrical portions.

4. The structure of claim 1 in which said body has a frusto-conical portion at each end and which terminates in flattened ends so that said body can be stored in a generally vertical position.

5. The structure of claim 1 in which said body is of unitary construction.

6. The structure of claim 1 in which said body is constructed of multiple portions connected together by a central shaft.

References Cited by the Examiner

UNITED STATES PATENTS

| | | | |
|---|---|---|---|
| 2,175,197 | 10/1939 | Kent | 272—1 |
| 3,116,925 | 1/1964 | Welch | 272—1 |
| 3,138,375 | 6/1964 | Smith | 272—1 |

RICHARD C. PINKHAM, *Primary Examiner.*

F. B. LEONARD, A. W. KRAMER, *Assistant Examiners.*